Figure 1:
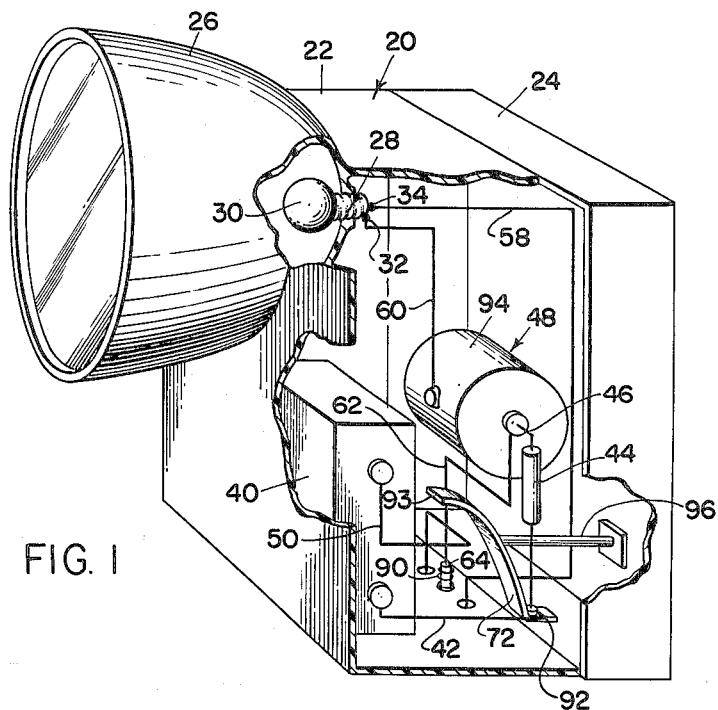

Jan. 31, 1961  R. C. CASSELMAN ET AL  2,969,721

PHOTOFLASH UNIT

Filed June 23, 1958

INVENTORS
Robert C. Casselman
Dexter P. Cooper, Jr.
and
BY Wilbur C. Otis

Brown and Mikulka
ATTORNEYS

United States Patent Office 2,969,721
Patented Jan. 31, 1961

2,969,721

PHOTOFLASH UNIT

Robert C. Casselman, Auburndale, Dexter P. Cooper, Jr., Lexington, and Wilbur C. Otis, Winchester, Mass., assignors to Polaroid Corporation, Cambridge, Mass., a corporation of Delaware Filed June 23, 1958, Ser. No. 743,658

9 Claims. (Cl. 95—11.5)

This invention relates to photographic apparatus and more particularly to a device for obtaining flash illumination for photography.

In the photographic art, devices wherein pulses of electrical power have been employed to actuate lighting apparatus are well known. The lighting apparatus has usually included a conventional vaporizable element or a gas-filled discharge element, the former being employed for but a single flash and hence requiring a substantial number of such elements for a series of photographs, the latter being expensive and requiring complex and bulky circuitry. Consequently, an object of this invention is to provide a compact and inexpensive battery-capacitance flash lamp capable of producing a series of light flashes from a re-usable light-producing element.

Another object of this invention is to provide a novel and improved device for obtaining flash lighting of photographic intensity from a conventional incandescent lamp bulb.

Other objects of this invention are to provide, in a photoflash unit which is detachably secured to a camera, an electrical circuit comprising a bulb-holding means, a conventional incandescent bulb mounted in said bulb-holding means, a capacitive element, an electrical power source for energizing said capacitive element to an overload charge relative to the normal operating characteristics of said bulb, a resistive element electrically disposed in series between said capacitive element and said electrical power source, and means for electrically coupling said circuit with a shutter synchronizing switch means in said camera for discharging the overload charge of said condenser through said bulb; and to provide such a flash unit adapted for releasable mounting upon a camera and having a mounting means comprising a means for completing both a circuit for charging the capacitor and for completing a circuit coupling said flashgun with a flash-synchronizing switch in said camera only when said gun is mounted on said camera.

A further object of this invention resides in the provision of a photoflash unit as hereinbefore described wherein said circuit is enclosed in a casing, and includes safety means for discharging said condenser when a portion of said casing is removed.

A still further object is the provision of a novel process whereby an incandescent bulb is momentarily overloaded in a predetermined manner to produce a light flash of photographic intensity.

Other objects of the invention will in part be obvious and will in part appear hereinafter.

The invention accordingly comprises the apparatus possessing the construction, combination of elements, and arrangement of parts, and further comprises the several steps and relation and order of one or more of such steps with respect to each of the others which are exemplified in the following detailed disclosure, and the scope of the application of which will be indicated in the claims.

Figure 2:
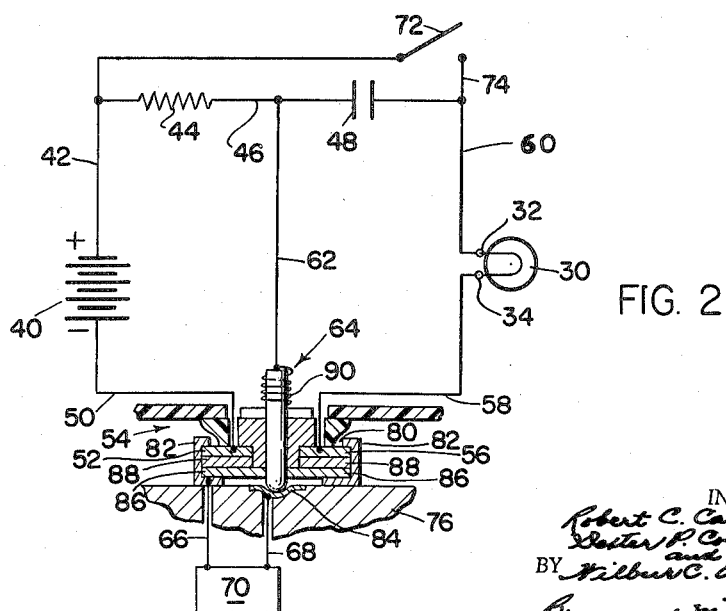

For a fuller understanding of the nature and objects of the invention, reference should be had to the following detailed description taken in connection with the accompanying drawing wherein:

Figure 1 is a schematic perspective view of an embodiment of the invention showing some parts in fragment only; and Fig. 2 is a circuit diagram of the flashgun shown in Fig. 1 including a section taken along a portion of the housing to show a mounting foot inserted in a mounting portion of a camera.

The invention disclosed herein comprises a self-contained photoflash unit of the type adapted for detachable mounting by suitable mounting means upon a camera having a built-in flash synchronizing means such as a shutter actuated switch. The unit, being preferably portable, comprises an electrical power source such as a battery, an electrically capacitive element and other electrical elements of a battery-capacitance flash circuit which is operatively connectable with said flash synchronizing means, the connection preferably being provided by the flash unit mounting means. The flash unit also comprises a casing in which the electrical elements are operatively mounted. Attached to the casing is a reflecting means in which a light-producing element, preferably an incandescent lamp bulb, may be mounted. The flash unit thus provided constitutes a very compact, rugged and light-weight unit which is less expensive in both construction and maintenance than other flashguns known to the art.

Incandescent bulbs are well known in the art and usually comprise a glass envelope containing a metallic filament. By introducing an electric current therein, the filament is brought to and maintained at a normal operating temperature at which it is incandescent, the filament being disposed in a vacuum or an atmosphere of relatively inert gas. Normally, when a circuit containing such an incandescent bulb is closed, there is a time delay before the filament of the bulb reaches its normal operating temperature. (The normal operating temperature may be defined as that limited range of temperatures at which a filament is maintained when subject to a steady-state current and voltage in accordance with the manufacturer's rated specifications.) For instance, for a 0.5 ampere incandescent lamp, the time delay is ordinarily in the order of 70 milliseconds. During this period, the current flowing may reach a peak of from 10 to 15 times the normal value due to the large difference between the cold and hot resistance of the filament. If, however, a condenser is charged through a resistance to a predetermined voltage considerably above the operating voltage of such a bulb and then discharged therethrough, the initial current surge raises the filament to a flashing temperature which is well above its normal operating temperature but somewhat less than the melting point of the filament. The discharge may be so arranged that, by the time the filament has reached its flashing temperature, the voltage across the condenser will have dropped to the operating voltage of the lamp, thus preventing the melting of the filament. In such circumstances, a delay as short as 10 milliseconds may be obtained after closing the circuit. In general, high voltage, small capacitance and high resistance produce the shortest delay and the shortest flash duration for a given bulb.

Similarly, small diameter filaments, as may be found in low amperage bulbs, may be made to give the shortest flash durations because filament heating and cooling is more rapid; however, with a given capacitor, a smaller filament may give a longer flash than a large one because of its lower current drain. Consequently, a tungsten filament lamp, such as an automobile headlight bulb, may be operated with a suitable condenser discharge and made to flash at a temperature near its melting point for a considerable number of times by a series of such discharges. The duration of the flash largely depends on the discharge time constant of the circuit and may hence be predetermined by choosing the appropriate combination of condenser, resistance and voltage for a given bulb. One advantage of such a combination lies in the extended life expectancy of a bulb operating momentarily at such high temperatures compared to the life span of operation at substantially longer flash intervals.

Referring now to the drawing, there is shown in Fig. 1 one form of an apparatus such as a flash unit embodying the invention and comprising a casing or housing indicated generally at 20 for supporting and enclosing the elements of the unit hereinafter described. Housing 20 preferably comprises first housing portion 22 and a second housing portion 24 normally disposed relative to housing portion 22 for forming a container, both housing portions being shown only in fragment and being separable from one another to provide access to said elements by an operator of the unit.

Associated with housing 20 is a reflecting means such as reflector 26 which may be any of the flash reflectors well known in the art and is preferably ellipsoidal. The reflector may, of course, be made of metal or other suitable material and have its inner surface appropriately polished or reflecting. Disposed in the concavity of reflector 26 and adjacent the vertex thereof is a bulb supporting means 28, such as any of the bulb sockets known to the art, but which is preferably adapted to receive a miniature, threaded-base type of bulb. Disposed in socket 28 is a light-producing means such as bulb 30 which is preferably of the tungsten filament incandescent type having a threaded base. Bulb 30 is disposed with its base projecting axially into socket 28 for releasably securing the bulb within the socket and for electrically connecting the bulb with other elements of the flash unit. Electrical contacts are formed and located in the usual manner between the bulb threads and socket and between the bulb base and socket, such contacts being designated respectively at 32 and 34.

The circuit disclosed schematically in Fig. 2, the physical counterparts of which are shown in Fig. 1 mounted in first housing portion 22, comprises an electrical power source such as battery 40, the positive terminal of which is connected by means such as lead 42 to an electrical resistance element such as resistor 44 which in turn is connected by lead 46 to the positive plate of an electrically capacitive element, for instance, condenser 48. The negative side of the battery is connected by lead 50 to one element 52 of a mounting switch means which is generally indicated by the reference numeral 54. A second element 56 of switch means 54 is connected by lead 58 to contact 34 of bulb socket 28 while the other contact 32 from the bulb socket is connected by lead 60 to the negative plate of the condenser 48. It will thus be noted that switch means 54, bulb socket 28, condenser 48, resistor 44 and battery 40 are all connected in series, and comprise a charging circuit. The positive plate of condenser 48 is also connected by means such as lead 62 to a third element 64 of mounting switch means 54, thus comprising a portion of a firing circuit. Shown in Fig. 2 connected to switch means 54, by means such as leads 66 and 68, is a shutter-actuated, flash-synchronizer switch 70 of a camera upon which the unit is adapted to be mounted.

Also shown in Fig. 2 is a secondary network or safety switching circuit which includes a second switching means such as switch 72 which may be actuated by an operator of the unit for discharging condenser 48 through resistor 44, switch 72 being electrically connected by means such as lead 74 to the negative terminal of condenser 48 and actuatable for electrically connecting said negative terminal of the condenser to a point in the charging circuit between battery 40 and resistor 44.

As previously indicated, the battery-capacitance circuit comprising battery 40, condenser 48 and other electrical elements is connected with flash-synchronizer switch 70 associated with the shutter of the camera. As previously noted, the circuit is electrically connected to a means for mounting the unit on a camera, a portion of said camera being indicated generally at 76 in Fig. 2. As may be seen, the mounting means comprises mounting switch means 54 for substantially simultaneously completing the charging circuit for charging capacitor 48 and for completing the firing circuit by coupling the condenser and bulb socket with a flash-synchronizer switch 70 of said camera, as well as providing a mechanical support for the unit relative to the camera.

The mounting switch means 54 includes, in the form shown, a flanged foot 80 adapted for engagement with a clip 82 on the camera and the third element of the mounting switch means 54, herein shown as detent plunger 64. The foot 80 comprises U-shaped foot plate 86 and the first and second elements of the mounting switch means 54, shown as connectors 52 and 56 respectively, composed of an electrically conducting material such as steel. A sheet 88 of electrically insulating material is so disposed as to separate plate 86 and connectors 52 and 56 from one another. Connectors 52 and 56 are secured in fixed relation to the other elements of the unit and are so formed that they may be releasably engaged in short circuit by clip 82 on the camera and electrically connected thereby to lead 66 of the synchronizer discharge switch 70. A second electrical contact is made with synchronizer switch 70 in the camera by detent plunger 64 which comprises a pin adapted to contact and engage detent contact 84 on the camera, detent contact 84 being electrically coupled by lead 68 to synchronizer switch 70. Plunger 64 extends through a portion of housing 20 and extends between connectors 52 and 56 and is resiliently retained in this position and electrically connected with lead 62 attached to the positive terminal of condenser 48 by means such as spring 90. The construction of the clip and detent contact of the camera and of such a retaining foot is more fully disclosed in the copending application of Edison R. Brandt, Serial No. 743,657, filed concurrently herewith.

As a safety means for discharging condenser 48 through resistor 44 on such occasions as when an operator of the unit may desire to open the housing, there is provided an element such as switch 72 which, in the form shown, comprises a curved, resilient, electrically conducting strip having a turned-down extremity 92 which is mounted by suitable means to a portion of first housing portion 22 and a movable extremity 93. The movable extremity of switch 72 is normally disposed to releasably engage one terminal of the condenser such as metallic cover 94 and turned-down extremity 92 is electrically connected to a point in the charging circuit between resistor 44 and the positive terminal of battery 40. Suitably disposed upon a portion of second housing portion 24 is a switch detent means such as finger 96 which is so disposed as to releasably engage switch 72 and retain the switch out of engagement with condenser cover 94 when second housing portion 24 is normally disposed relative to first housing portion 22.

In operation, the flashgun is mounted upon the camera by insertion of foot 80 into clip 82. The engagement of the foot with the clip causes detent plunger 64 to move axially against the bias of spring 90 until the plunger is in a predetermined position with respect to the detent contact 84, thereby completing a circuit which includes flash-synchronizer switch 70 of the camera and allows condenser 48 to be discharged through bulb 30 upon actuation of the flash-synchronizer switch by operation of the shutter of the camera. Additionally, the engagement of connectors 52 and 56 with clip 82 serves to complete the charging circuit, thereby charging condenser 48 preparatory to discharge through bulb 30. As may therefore be seen, there is no charging drain upon battery 40 until the flashgun has been mounted upon camera 76, and the removal of the flashgun from the camera will effectively act to remove the battery from the circuit.

The removal of second housing portion 24 from first housing portion 22 removes finger 96 from its position relative to switch 72, thereby allowing one switch to return to its normal position under its own resilient bias for contacting cover 94 of condenser 48 and completing a discharge circuit whereby the charge on the condenser, if any, is released through resistor 44, thus preventing the possibility of accidental shock to an operator of the gun on those occasions when it is necessary, for instance, to replace the incandescent bulb or other components of the circuit.

The flash characteristics obtained by the operation of the flashgun vary considerably according to the constructional features of or the values chosen for the various electrical elements. For instance, as between two incandescent filament lamps, a first bulb having a relatively inert gaseous atmosphere and a second bulb having a relative vacuum surrounding its filament, the former may be brought to a higher operating temperature by increasing its input discharge without impairing its life span comparatively to the latter. A filament temperature-discharge time curve of the lamp will vary according to such parameters as the physical dimensions of the filament, the atmosphere about the filament, the charging voltage, the total capacitance, the battery wattage and others. Preferably, the gun should comprise electrical elements the values of which have been predetermined for obtaining a flash whose characteristics are matched to the operating characteristics of the shutter employed in order to obtain peak lamp brightness while the shutter is open. As an example, the shutter shown in U.S. Patent No. 2,662,457 has an exposure time interval range of approximately from 1/25 to 1/100 second, and displays a nominal time delay interval of 20 milliseconds from the closure of the flash-synchronizer discharge switch to the opening of the shutter blade. It should be noted that in this type of shutter mechanism, because of the efficient high speed of opening, the sequence of events demands closure of the flash-synchronizer switch contacts before movement of the shutter blade. Desirable synchronization of the flashgun with such a shutter dictates a flash that reaches peak intensity preferably at 20±5 milliseconds following closure of the switch contacts so that the maximum light intensity is available at full opening of the shutter regardless of shutter "speed." Additionally, in order to obtain optimum results, the duration of the flash is such that the light subsides in an interval from peak intensity in the nature of 40±5 milliseconds. Such a delay interval and duration interval may be predetermined by choosing the appropriate combination of capacitance, resistance and battery wattage for a particular bulb.

A preferred embodiment, therefore, calls for a miniature incandescent bulb of a relatively high amperage, low voltage type such as a bulb rated at 0.25 ampere and 12 volts, such a bulb bearing the manufacturer's designation of G-4 1/2. For use with such a bulb, condenser 48 preferably is in the form of the well known cylindrical, electrolytic condenser for compactness and for reliability in operation. However, condenser 48 may be provided in any other form well known to the art, the static capacitance of the condenser being determined most particularly by the characteristics of the bulb employed. A suggested upper limit of the capacitance of condenser 48 is in the nature of 1100 microfarads in order to avoid the danger of burning out the bulb filament by an excessive overload discharge, the preferred condenser being a 850 microfarad±20% measured at 10 cycles, 50 W.V.D.C. electrolytic. Battery 40, the source of electrical energy for the circuit, is preferably of the 45 volt type inasmuch as a low voltage requires a high capacitance and therefore a bulkier condenser with comparatively high leakage. Additionally, the 45 volt battery is small, compact and therefore readily adapted for use in the disclosed flash unit. Resistor 44 is preferably a 1000 ohm, 0.5 watt resistor which will allow the preferred condenser to recharge in approximately 5 seconds, the higher the resistance, the less the discharge of the battery and the longer the charging time. Consequently, the resistor value chosen in this preferred embodiment represents an optimum for the circuit where the battery life is reasonably prolonged and a sufficiently short charging time is maintained. It should be noted that the preferred battery is of a low wattage type inasmuch as a high wattage battery in combination with a low resistance results in unnecessary maintenance of flash duration through battery drain into the bulb filament during high temperature operation.

The values of the various elements, as previously noted, may be altered to obtain various operating characteristics and to modify the physical dimensions of the unit. For instance, a unit comprising a #430 bulb rated at 0.25 ampere and 14 volts may be used with a 1400 microfarad condenser, a 45 volt battery and a 1000 ohm resistor. However, this provides a bulkier condenser with a larger battery drain than the preferred embodiment.

Another example comprises a #432 bulb rated at 0.25 ampere and 18 volts used with a 500 microfarad condenser, a 1300 ohm resistor and a 67.5 volt battery. This unit provides excellent flash characteristics but includes a substantially heavier battery than is found in the preferred form.

Although a specific polarity has been indicated in some elements of this invention, it should be clear that such polarity is merely descriptive and may be consistently reversed throughout the unit without material alteration of the function of the device. The flashgun disclosed herein has been described as particularly usable with a shutter as shown in U.S. Patent No. 2,662,457, but it is apparent that it may be readily employed with other shutters comprising a flash-synchronizer switch, the constructional dimensions of the mounting means of the gun being easily altered to fit other camera clips.

Since certain changes may be made in the above apparatus and process without departing from the scope of the invention herein involved, it is intended that all matter contained in the above description or shown in the accompanying drawing shall be interpreted as illustrative and not in a limiting sense.

What is claimed is:

1. A photoflash unit for use with a camera having a flash-synchronizing switch, said unit comprising, in combination, an electrically capacitive element, an electrical resistance, a power source for supplying electrical energy through said resistance for charging said capacitive element, a low voltage incandescent filament bulb coupled with said capacitive element, said capacitive element being chargeable to an overload level with respect to the electrical characteristics of said bulb, and means for so coupling said synchronizing switch with said capacitive element and said bulb that upon actuation of said synchroniding switch the charge on said capacitive element is discharged through said bulb and said filament is raised to a temperature just short of its melting point.

2. A photoflash unit for use with a camera having a flash-synchronizing switch, said unit comprising, in combination, a series circuit comprising an electrically capacitive element, a resistor, a power source for supplying electrical energy through said resistor for charging said capacitive element, a low voltage incandescent filament bulb coupled with said capacitive element and with said power source, said capacitive element being chargeable to a non-destructive overload level with respect to the electrical characteristics of said bulb, means for so coupling said synchronizing switch with said capacitive element and said bulb that upon actuation of said switch said capacitive element is discharged to substantially overload said bulb, and means for so directing light from the overloaded bulb as to illuminate at least a portion of the field of view of said camera.

3. A photoflash unit for use with a camera having an electrically conducting portion for mounting said unit upon said camera, said unit comprising, in combination, a circuit including a battery, a resistance connected in series with said battery, a condenser connected in series with said resistance, a low voltage incandescent filament bulb connected in series with said condenser, a switching means for connecting said battery with said condenser, said switching means being engageable with said electrically conducting portion of said camera and being actuated by engagement with said portion for completing said circuit to charge said condenser, said condenser being chargeable to a non-destructive overload level with respect to the characteristics of said bulb, means for discharging the overload on said condenser through the bulb filament, and means for directing the light from the overloaded filament to illuminate subject matter intended to be photographed synchronously by the camera.

4. A photoflash unit for use with a camera having a flash-synchronizing switch and an electrically conducting portion coupled with said switch and for mounting said unit upon said camera, said unit comprising, in combination, a first circuit including a battery, a resistance connected in series with said battery, a condenser connected in series with said resistance, a low voltage incandescent filament bulb connected in series with said condenser, and a first switching means for connecting said battery in series with said condenser, a second circuit comprising a second switching means connected in parallel with said bulb and with said condenser, said first switching means being engageable with said electrically conducting portion of said camera for actuating said first switching means to place a charge upon said condenser, said second switching means being engageable with said electrically conducting portion of said camera for so electrically connecting said second circuit with said synchronizing switch of said camera that said condenser is discharged through said bulb upon actuation of said synchronizing switch, said charge being predetermined as such an overload with respect to the filament of said bulb as will raise the temperature of said filament to just short of its melting point upon being discharged through said filament, and means for so directing light from the overloaded filament as to illuminate at least a portion of the field of view of said camera.

5. A photoflash unit for use with and mountable upon a camera having a flash-synchronizing switch, said unit comprising, in combination, a housing means for enclosing and mounting the element of said unit, said housing means having a separable portion, a light-reflecting means associated with said housing and for directing light at the field of view of said camera when mounted upon said camera, a series circuit comprising in sequence, a battery, a resistor, a condenser, a low voltage incandescent filament bulb disposed in operative relation to said reflecting means, said condenser being chargeable through said resistance by said battery to a charge level which is a non-destructive overload with respect to said bulb, and means for so coupling said synchronizing switch with said condenser and said bulb that upon actuation of said switch said condenser is so discharged as to substantially overload said bulb, thereby obtaining a momentary light-flash of photographic intensity.

6. A photoflash unit as defined in claim 5 including a means for discharging said condenser through said resistor, said means being actuable by removal of said separable portion from said casing.

7. A photoflash unit as defined in claim 6 wherein said means for discharging said condenser comprises a safety switch having two terminals, one of said terminals being connected with a portion of said circuit at a point between said bulb and said condenser, and an electrically conducting means for connecting the other of said terminals of said safety switch to a portion of said series circuit at a point between said resistor and said battery.

8. A photoflash unit as defined in claim 7 wherein said safety switch comprises a resilient electrically conducting strip mounted on said housing means, and said separable portion of said housing means includes an upstanding portion for retaining said strip in a first position wherein said strip is out of contact with said condenser, said strip being biased for movement into engagement with said condenser upon removal of said separable portion.

9. A photoflash unit as defined in claim 1 wherein said low voltage of said incandescent filament bulb is not greater than 18 volts.

References Cited in the file of this patent

UNITED STATES PATENTS

| | | |
|---|---|---|
| 2,277,233 | Kende | Mar. 24, 1942 |
| 2,290,264 | Wuerfel | July 21, 1942 |
| 2,899,880 | Graef | Aug. 18, 1959 |

FOREIGN PATENTS

| | | |
|---|---|---|
| 386,552 | Great Britain | Jan. 19, 1933 |
| 696,468 | Great Britain | Sept. 2, 1953 |